United States Patent
Bae et al.

(10) Patent No.: US 11,223,748 B2
(45) Date of Patent: Jan. 11, 2022

(54) COLOR GAMUT MAPPING DEVICE CAPABLE OF FINE ADJUSTMENT

(71) Applicant: SILICON WORKS CO., LTD., Daejeon (KR)

(72) Inventors: Chang Young Bae, Daejeon (KR); Heung Lyeol Lee, Daejeon (KR); Hyun Kyu Jeon, Daejeon (KR)

(73) Assignee: SILICON WORKS CO., LTD., Daejeon (KR)

( * ) Notice: Subject to any disclaimer, the term of this patent is extended or adjusted under 35 U.S.C. 154(b) by 0 days.

(21) Appl. No.: 17/065,764

(22) Filed: Oct. 8, 2020

(65) Prior Publication Data
US 2021/0120148 A1    Apr. 22, 2021

(30) Foreign Application Priority Data

Oct. 16, 2019 (KR) .................. 10-2019-0128252

(51) Int. Cl.
*H04N 1/60* (2006.01)

(52) U.S. Cl.
CPC ......... *H04N 1/6058* (2013.01); *H04N 1/6075* (2013.01)

(58) Field of Classification Search
None
See application file for complete search history.

(56) References Cited

U.S. PATENT DOCUMENTS

| | | | | |
|---|---|---|---|---|
| 7,339,619 B2* | 3/2008 | Tsuruoka | ............... | H04N 9/646 348/182 |
| 2004/0119721 A1* | 6/2004 | Kim | .................. | H04N 9/643 345/600 |
| 2005/0094886 A1* | 5/2005 | Mimamino | .......... | H04N 1/6005 382/254 |
| 2005/0185836 A1* | 8/2005 | Huang | ................. | H04N 1/648 382/162 |
| 2005/0219574 A1* | 10/2005 | Ok | .................... | H04N 1/6058 358/1.9 |

(Continued)

FOREIGN PATENT DOCUMENTS

| JP | 2006304149 A | * | 11/2006 |
|---|---|---|---|
| JP | 4423226 B2 | | 3/2010 |
| KR | 10-0552695 B1 | | 2/2006 |

*Primary Examiner* — Ted W Barnes
(74) *Attorney, Agent, or Firm* — Harness, Dickey & Pierce, P.L.C.

(57) ABSTRACT

There is provided a color gamut mapping device capable of fine adjustment configured to map a color signal to a predetermined color gamut by changing the saturation, hue, and luminance of the corresponding color signal, the color gamut mapping device including a hue angle calculation unit configured to calculate a hue angle using saturation components (Cb, Cr) of a YCbCr-type color signal (Y, Cb, Cr); a parameter generation unit configured to generate at least one of a saturation parameter, a luminance parameter, and a hue parameter using the hue angle; and a color signal changing unit configured to change the YCbCr-type color signal (Y, Cb, Cr) to be mapped to a predetermined color gamut using the parameter, wherein the color signal changing unit includes a saturation changing unit configured to calculate a saturation boundary value determined as a boundary of a predetermined rectangle on a Cb-Cr coordinate plane.

18 Claims, 14 Drawing Sheets

(56) References Cited

U.S. PATENT DOCUMENTS

| | | | |
|---|---|---|---|
| 2008/0158246 A1* | 7/2008 | Ishii | G06T 7/12 |
| | | | 345/604 |
| 2010/0060670 A1* | 3/2010 | Kuo | G09G 5/02 |
| | | | 345/690 |
| 2013/0321675 A1* | 12/2013 | Cote | H04N 9/646 |
| | | | 348/242 |
| 2015/0262550 A1* | 9/2015 | Kawaguchi | G09G 5/06 |
| | | | 345/601 |

* cited by examiner

| Angle (°) | Axis | Angle (°) | Axis |
|---|---|---|---|
| 0° ~ 29° | 0 Axis | 180° ~ 209° | 6 Axis |
| 30° ~ 59° | 1 Axis | 210° ~ 239° | 7 Axis |
| 60° ~ 89° | 2 Axis | 240° ~ 269° | 8 Axis |
| 90° ~ 119° | 3 Axis | 270° ~ 299° | 9 Axis |
| 120° ~ 149° | 4 Axis | 300° ~ 329° | 10 Axis |
| 150° ~ 179° | 5 Axis | 330° ~ 359° | 11 Axis |

| Angle (°)  | Axis   | Angle (°)  | Axis    |
|------------|--------|------------|---------|
| 354° ~ 22° | 0 Axis | 173° ~ 230° | 6 Axis  |
| 23° ~ 47°  | 1 Axis | 204° ~ 228° | 7 Axis  |
| 48° ~ 72°  | 2 Axis | 229° ~ 252° | 8 Axis  |
| 73° ~ 101° | 3 Axis | 253° ~ 281° | 9 Axis  |
| 102° ~ 136° | 4 Axis | 282° ~ 316° | 10 Axis |
| 137° ~ 172° | 5 Axis | 317° ~ 353° | 11 Axis |

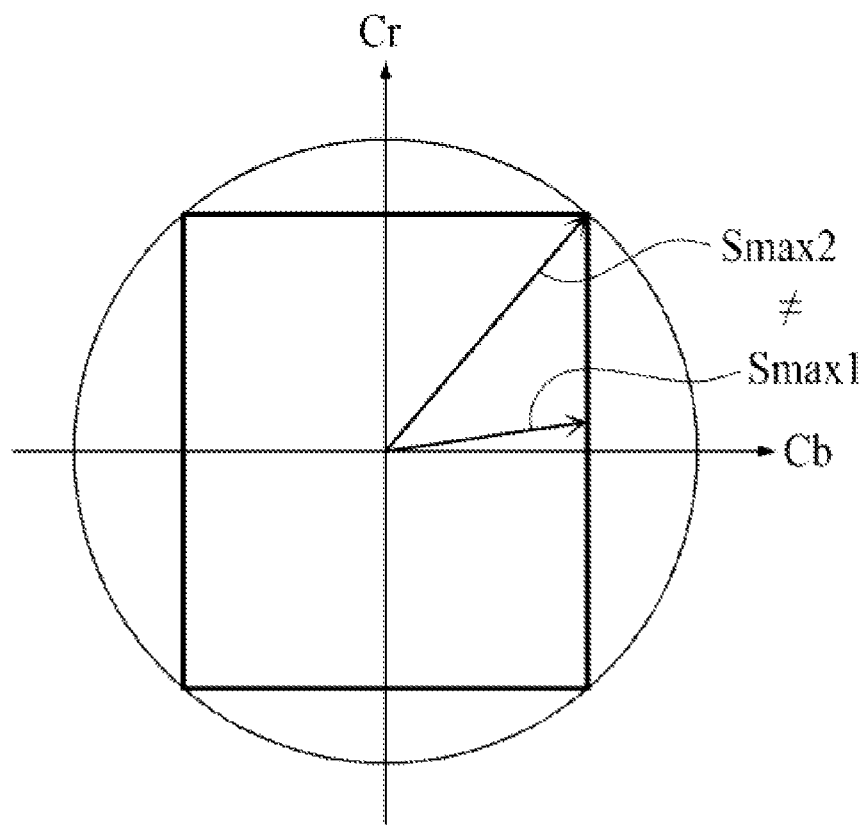

COLOR GAMUT MAPPING DEVICE CAPABLE OF FINE ADJUSTMENT

CROSS-REFERENCE TO RELATED APPLICATIONS

This application claims the benefit of the Korean Patent Applications No. 10-2019-0128252 filed on Oct. 16, 2019, which are hereby incorporated by reference as if fully set forth herein.

FIELD

The present disclosure relates to a color gamut mapping device.

BACKGROUND

In general, color reproducing devices, such as a monitor, a scanner, and a printer, use different color spaces or color models depending on the field of use. For example, the cyan, magenta, and yellow (CMY) color space is used for color image printing devices, the red, green, and blue (RGB) color space is used for color cathode ray tube (CRT) monitors or computer graphic devices, and the hue, saturation, and intensity (HSI) color space is used for devices that deal with hue, saturation, and luminance separately. Further, the CIE color space, which is color space based on luminance and a color-difference signal, is often used to define so-called device-independent colors precisely reproducible in any device and includes the CIE-LAB color space, the CIE-xyY color space, the CIE-CAM02 color space, and the like.

The color reproducing devices may not only have different color spaces but may also have different color gamuts. A color space indicates a color-defining method, that is, a method of showing relationships between a certain color and other colors, whereas a color gamut indicates a hue reproduction range.

Accordingly, when an input color signal has a different color gamut from a device reproducing the input color signal, there is a need for color gamut mapping in which the input color signal is appropriately converted to match their color gamuts to each other and thus improve color reproduction.

SUMMARY

Accordingly, the present disclosure provides a color gamut mapping device that is capable of fine adjustment and that is configured to map a color signal to a predetermined color gamut by changing the saturation, hue, and luminance of the corresponding color signal.

The present disclosure provides a color gamut mapping device capable of fine adjustment configured to change the saturation of a color signal according to a plurality of saturation reference values when the saturation of the color signal is changed.

The present disclosure provides a color gamut mapping device capable of fine adjustment configured to match a hue axis to a primary color and a secondary color.

According to an aspect of the present disclosure, a color gamut mapping device includes a hue angle calculation unit configured to calculate a hue angle using saturation components (Cb, Cr) of a YCbCr-type color signal (Y, Cb, Cr), a parameter generation unit configured to generate at least one of a saturation parameter, a luminance parameter, and a hue parameter using the hue angle, and a color signal changing unit configured to change the YCbCr-type color signal (Y, Cb, Cr) to be mapped to a predetermined color gamut using the parameter, wherein the color signal changing unit includes a saturation changing unit configured to calculate a saturation boundary value determined as a boundary of a predetermined rectangle on a Cb-Cr coordinate plane using the saturation parameter and configured to change the saturation components (Cb, Cr) on the basis of the saturation boundary value.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings:

FIG. 4B is a diagram showing that a reference value calculation unit according to an embodiment of the present disclosure calculates a saturation boundary value;

DETAILED DESCRIPTION

Terms such as "including" and "having" used herein are intended to allow other elements to be added unless the terms are used with the term "only." Any references to the singular may include the plural unless expressly stated otherwise.

Although the terms first, second, etc. may be used herein to describe various elements, these elements should not be limited by these terms. These terms are only used to distinguish one element from another. Thus, a first element could be termed a second element without departing from the technical spirit of the present disclosure.

The term "at least one" should be understood as including any combination obtainable from one or more related items. For example, "at least one of a first item, a second item, and a third item" may indicate each of the first item, the second item, or the third item and may also indicate any combination obtainable from two or more of the first item, the second item, and the third item.

The features of various embodiments of the present disclosure may be partially or entirely joined to or combined with each other. The embodiments may be interoperated and performed in technically various ways and may be carried out independently of or in association with each other.

Hereinafter, embodiments of the present disclosure will be described in detail with reference to the accompanying drawings.

Figure 1A:
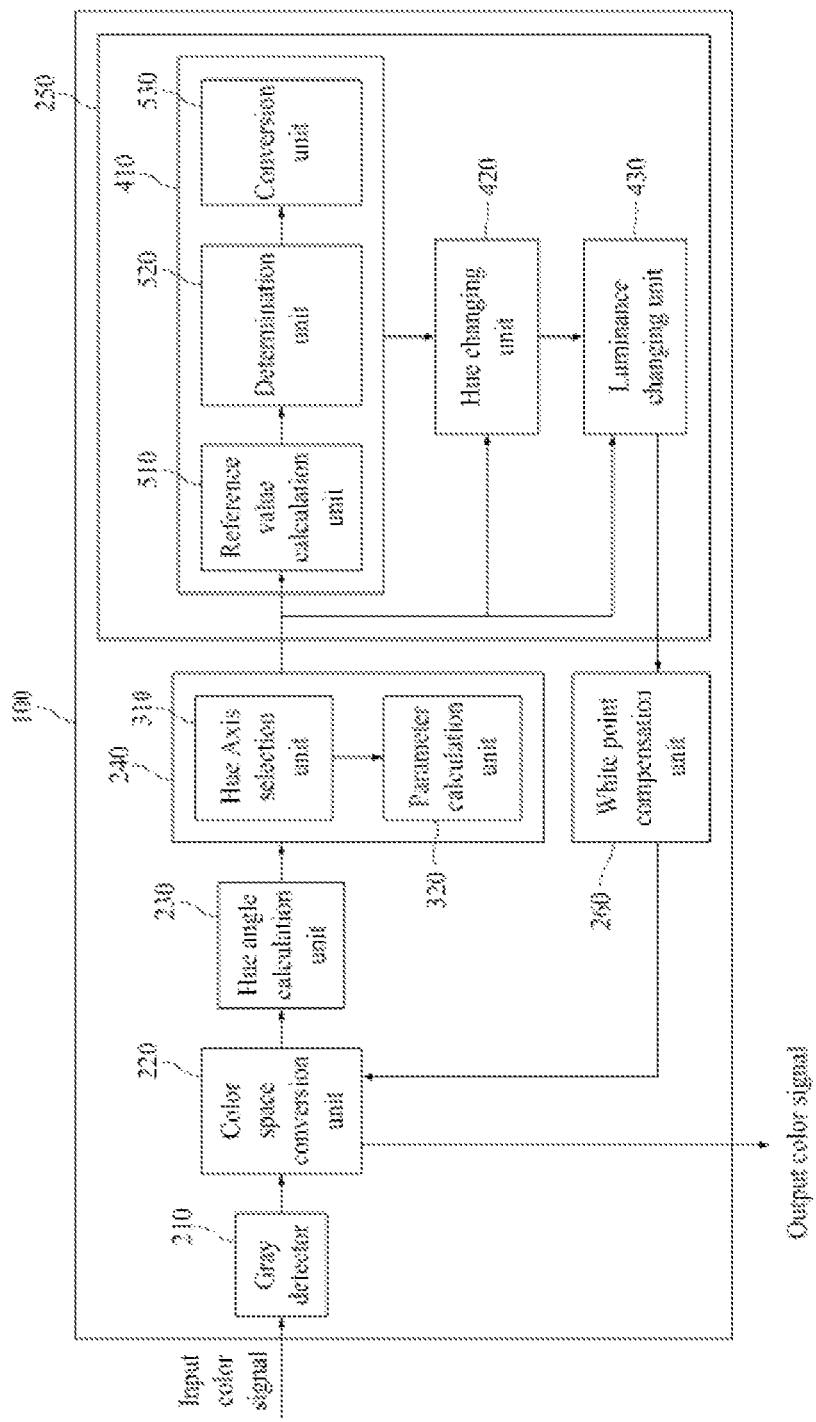
FIG. 1A is a block diagram showing a color gamut mapping device capable of fine adjustment according to an embodiment of the present disclosure.
Figure 1B:
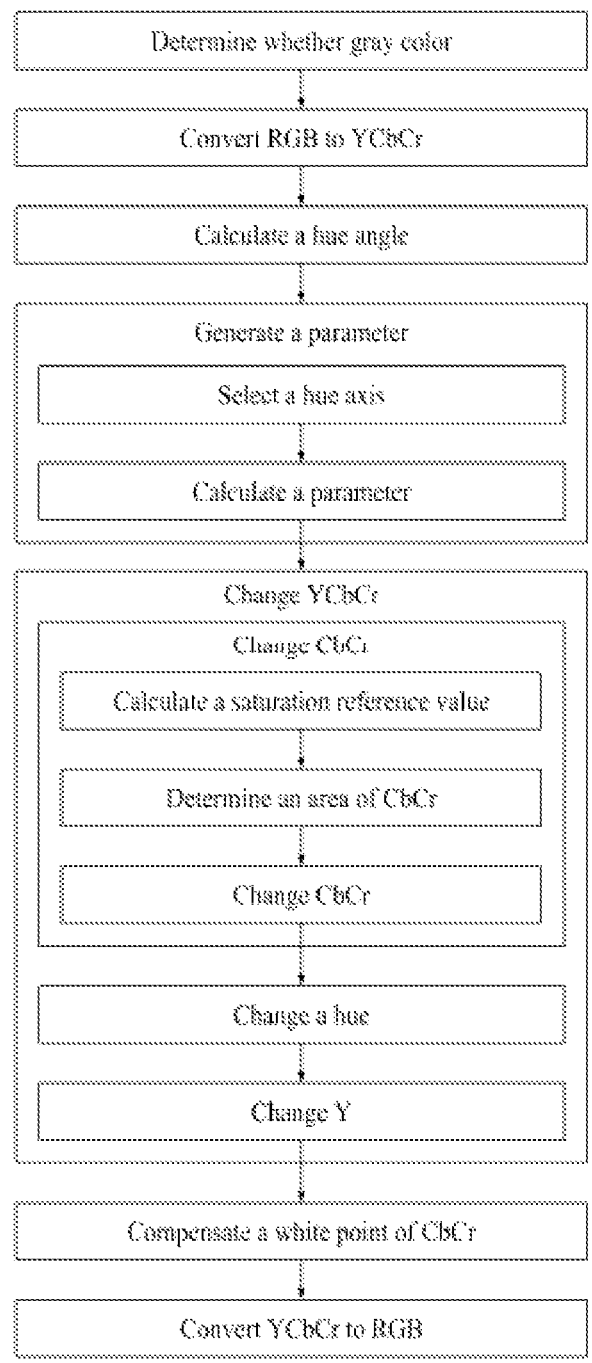
FIG. 1B is a flowchart illustrating example processing steps of a color gamut mapping device capable of fine adjustment according to an embodiment of the present disclosure.

FIG. 1A is a block diagram showing a color gamut mapping device capable of fine adjustment according to an embodiment of the present disclosure, and FIG. 1B is a flowchart illustrating example processing steps of a color gamut mapping device capable of fine adjustment according to an embodiment of the present disclosure. A color gamut mapping device 100 capable of fine adjustment according to the present disclosure (hereinafter referred to as a "color gamut mapping device") maps an input color signal to a reference color gamut. In this case, the color signal may be an RGB-type color signal (R, G, B) or a YCbCr-type color signal (Y, Cb, Cr).

To this end, as shown in FIG. 1A, the color gamut mapping device 100 includes a gray detector 210, a color space conversion unit 220, a hue angle calculation unit 230, a parameter generation unit 240, a color signal changing unit 250, and a white point compensation unit 260.

When a color signal is input, the gray detector 210 determines whether the color of the corresponding color signal is gray. In detail, when an RGB type color signal (R, G, B) is input, the gray detector 210 determines whether the corresponding color signal is gray and determines whether the corresponding color signal is mapped to a color gamut.

To this end, the gray detector 210 compares the RGB-type color signal (R, G, B) to a gray parameter. In this case, the gray parameter may be set by a user.

In an embodiment, the gray detector 210 may compare the maximum max(R−G, R−B, G−B) of differences R−G, R−B, and G−B between the components R, G, and B of the RGB-type color signal to the gray parameter using Equation 1 below:

$$(\max(R-G, R-B, G-B) < \text{gray\_parameter})  \quad\text{[Equation 1]}$$

When the maximum difference max(R−G, R−B, G−B) between the components R, G, and B of the RGB-type color signal is smaller than the gray parameter, the gray detector 210 determines that the corresponding color signal (R, G, B) is gray. For example, when it is assumed that, for the RGB-type color signal (R, G, B), R is 100, G is 105, and B is 102, the maximum difference Max{5, 2, 3} is equal to five. When the gray parameter is ten, the maximum difference between the components R, G, and B of the RGB-type color signal, i.e., five, is smaller than the gray parameter, and thus the gray detector 210 determines that the corresponding color signal (R, G, B) is gray.

When the gray parameter is four, the maximum difference between the components R, G, and B of the RGB-type color signal, i.e., five, is greater than the gray parameter, and thus the gray detector 210 determines that the corresponding color signal (R, G, B) is not gray.

When the RGB-type color signal (R, G, B) is determined to be gray, the gray detector 210 excludes the corresponding color signal (R,G, B) from color gamut mapping. For example, the gray detector 210 places the corresponding color signal (R, G, B) on a hue axis to exclude the corresponding color signal (R, G, B) from color gamut mapping.

When the RGB-type color signal (R, G, B) is not gray, the gray detector 210 forwards the corresponding color signal (R, G, B) to the color space conversion unit 220.

The reason why the gray detector 210 according to the present disclosure excludes the RGB-type color signal (R, G, B) from gamut mapping when the corresponding color signal (R, G, B) is determined to be gray is that when the saturation, hue, and luminance of the corresponding color signal (R, G, B) is changed and output, the corresponding color signal (R, G, B) may be determined as an artifact.

The color space conversion unit 220 converts an input RGB-type color signal (R, G, B) into a YCbCr-type color signal (Y, Cb, Cr). When the RGB-type color signal (R, G, B) is converted into the YCbCr-type color signal (Y, Cb, Cr), the color space conversion unit 220 forwards the corresponding YCbCr-type color signal (Y, Cb, Cr) to the hue angle calculation unit 230. When the input color signal is a YCbCr type rather than an RGB type, the color space conversion unit 220 passes and forwards the corresponding color signal to the hue angle calculation unit 230.

When the saturation, hue, and luminance of the YCbCr-type color signal (Y, Cb, Cr) is changed by the color signal changing unit 250 and then the YCbCr-type color signal (Y, Cb, Cr) is mapped to a predetermined color gamut, the color space conversion unit 220 inversely converts the corresponding color signal into the RGB-type color signal (R, G, B) and then outputs the RGB-type color signal (R, G, B).

The color space conversion unit 220 may convert the RGB-type color signal (R, G, B) into the YCbCr-type color signal using Equation 2 below:

$$\begin{bmatrix} Y \\ Cb \\ Cr \end{bmatrix} = \begin{bmatrix} (218 \times R + 732 \times G + 74 \times B) \\ (-120 \times R + (-403 \times G) + 523 \times B) \\ (523 \times R + (-475 \times G) + (-48 \times B)) \end{bmatrix}. \quad \text{[Equation 2]}$$

The color space conversion unit 220 may inversely convert the YCbCr-type color signal (Y, Cb, Cr) into the RGB-type color signal (R, G, B) using Equation 3 below:

[Equation 3]

$$\begin{bmatrix} R \\ G \\ B \end{bmatrix} = \begin{bmatrix} (1024 \times Y + 1577 \times (Cr - 8192)) \\ 1024 \times Y + (-470 \times (Cr - 8192)) + (-187 \times (Cb - 8192)) \\ 1024 \times Y + (1577 \times (Cb - 8192)) \end{bmatrix}.$$

The hue angle calculation unit 230 may calculate a hue angle (Hue) using saturation components Cb and Cr of the YCbCr-type color signal (Y, Cb, Cr). In detail, the hue angle calculation unit 230 calculates a hue angle of the corresponding color signal using Equation 4 below:

$$H = a\tan(Cb, Cr) \quad \text{[Equation 4]}$$

where H is a hue angle, and Cr and Cr are saturation components. The hue angle calculation unit 230 forwards the calculated hue angle H to the parameter generation unit 240.

The parameter generation unit 240 generates a parameter using the hue angle calculated by the hue angle calculation unit 230. In this case, the parameter may include at least one of a saturation parameter, a luminance parameter, and a hue parameter. To this end, the parameter generation unit 240 includes a hue axis selection unit 310 and a parameter calculation unit 320.

The hue axis selection unit 310 places a plurality of hue axes on the Cb-Cr coordinate plane. In this case, the Cb-Cr coordinate plane refers to a space in which the saturation components Cb and Cr of the YCbCr-type color signal are placed.

In an embodiment, the hue axis selection unit 310 rotates a plurality of hue axes by a predetermined angle. For example, the hue axis selection unit 310 may rotate a plurality of hue axes on the Cb-Cr coordinate plane such that the hue axes are placed at angles corresponding to primary hues (red, green, blue) and secondary hues (cyan, magenta, yellow).

Figure 2A:
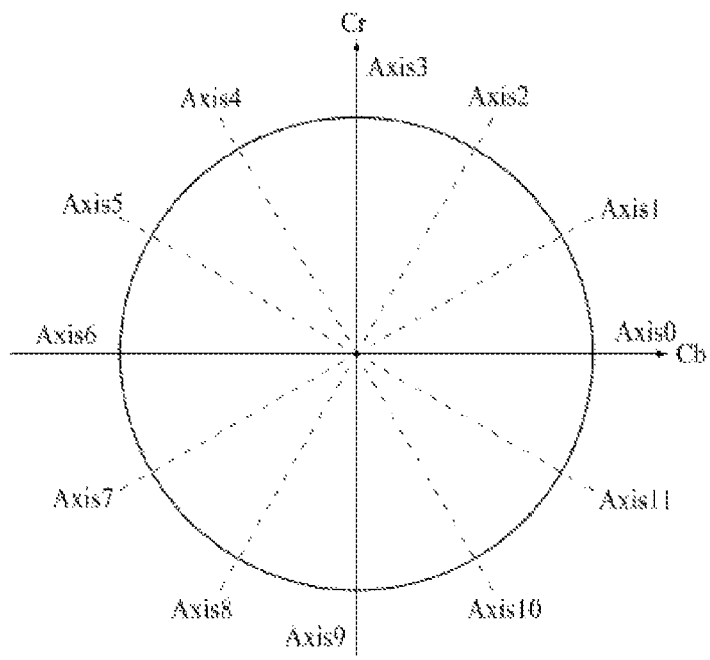
FIG. 2A is a diagram showing that hue axes are placed on the Cb-Cr coordinate plane in the related art.

Conventionally, as shown in FIG. 2A, 12 hue axes (axis0 to axis11) are placed at intervals of 30° on the Cb-Cr coordinate plane. Thus, no hue axes are placed at angles corresponding to the primary hue or the secondary hue. In this case, it is difficult to change a hue, and also it is not possible to finely map the color gamut.

Figure 2B:
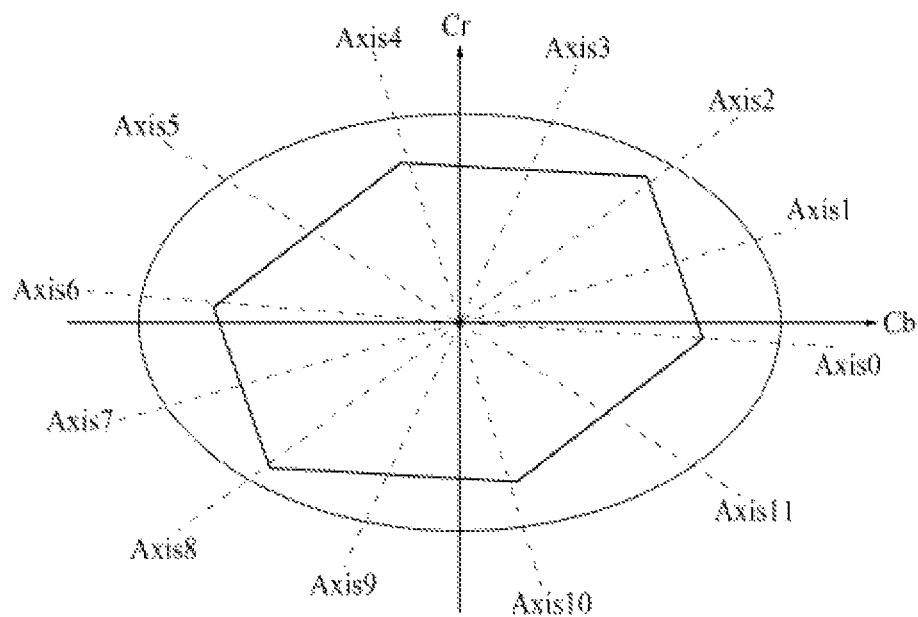
FIG. 2B is a diagram showing that a hue axis selection unit according to an embodiment of the present disclosure places hue axes on the Cb-Cr coordinate plane.

To solve this problem, according to the present disclosure, as shown in FIG. 2B, the hue axis selection unit 310 rotates the hue axes Axis0 to Axis11 such that the hue axes are placed at angles corresponding to primary hues red, green, and blue and secondary hues cyan, magenta, and yellow. Thus, it is possible to easily change a hue, and also it is possible to finely map a color gamut.

The hue axis selection unit 310 selects a first hue axis and a second hue axis including hue angle calculated by the hue angle calculation unit from among the hue axes Axis0 to Axis11 placed on the Cb-Cr coordinate plane. In this case, the second hue axis forms a greater angle than the first hue axis.

Figure 3:
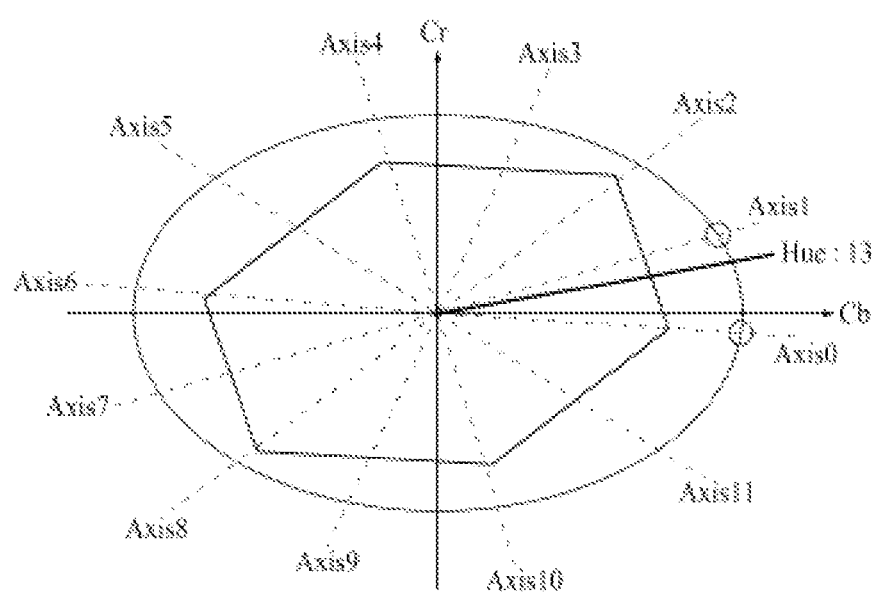
FIG. 3 is a diagram showing an example in which a parameter generation unit according to an embodiment of the present disclosure generates a parameter using a hue angle.

For example, when the hue angle Hue is 13° as shown in FIG. 3, the hue axis selection unit 310 may select the first hue axis Axis0 and the second hue axis Axis1 including the corresponding hue angle.

The parameter calculation unit 320 may calculate a parameter of a corresponding color signal using a first reference parameter mapped to the first hue axis, a second reference parameter mapped to the second hue axis, and the corresponding hue angle. To this end, a reference parameter may be mapped to each hue axis, and a reference parameter table (not shown) mapped to each hue axis may be stored.

The parameter calculation unit 320 may calculate the parameter of the corresponding color signal using Equation 5 below:

$$\text{Parameter} = \frac{(H\_Axis(n+1) - H)}{H\_Axis(n+1) - H\_Axis(n)} * P\_Axis(n+1) + \frac{(H - H\_Axis(n))}{H\_Axis(n+1) - H\_Axis(n)} * P\_Axis(n)$$ [Equation 5]

where H is a hue angle, H_Axis(n+1) is the angle of the second hue axis, H_Axis(n) is the angle of the first hue axis, P_Axis(n+1) is a second reference parameter mapped to the second hue axis, and P_Axis(n) is a first reference parameter mapped to the first hue axis.

As an example, the parameter calculation unit 320 calculates a luminance parameter using Equation 5. For example, as shown in FIG. 3, it is assumed that the hue angle is 13°, the angle of the first hue axis is −6°, the angle of the second hue axis is 23°, a first luminance reference parameter is $80/256$, and a second luminance reference parameter is $620/256$. The parameter calculation unit 320 may calculate the luminance as 0.206.

The parameter calculation unit 320 forwards the calculated parameter to the color signal changing unit 250.

The color signal changing unit 250 changes the YCbCr-type color signal (Y, Cb, Cr) using the parameter generated by the parameter generation unit 240. In detail, the color signal changing unit 250 changes the corresponding color signal using the parameter such that the YCbCr-type color signal (Y, Cb, Cr) is mapped to a predetermined color gamut.

To this end, the color signal changing unit 250 includes a saturation changing unit 410, a hue changing unit 420, and a luminance changing unit 430.

The saturation changing unit 410 changes the saturation components Cb and Cr of the YCbCr-type color signal (Y, Cb, Cr) using the saturation parameter generated by the parameter generation unit 240. In detail, the saturation changing unit 410 calculates a saturation reference value using a saturation parameter, compares the saturation reference value to the saturation values Saturation of the saturation components Cb and Cr, and changes the saturation components Cb and Cr according to a result of the comparison.

In this case, the saturation value Saturation of the saturation components Cb and Cr refers to a length from an origin to (Cb, Cr) on the Cb-Cr coordinate plane.

In an embodiment, the saturation parameter may include at least one of a saturation control point (Cbscp, Crscp), saturation boundary coordinates (Cbmax, Crmax), and a saturation slope. The saturation control point (Cbscp, Crscp) is a predetermined coordinate for calculating the saturation reference value, and the saturation boundary coordinates (Cbmax, Crmax) are a saturation component at a point where the saturation value Saturation is maximized and indicate the maximum point corresponding to the saturation components Cb and Cr of the YCbCr color signal. The saturation slope may be the slope of each region partitioned by the saturation control point (Cbscp, Crscp) in order to change the saturation components Cb and Cr of the YCbCr color signal.

The saturation changing unit 410 according to the present disclosure includes a reference value calculation unit 510, a determination unit 520, and a conversion unit 530.

The reference value calculation unit 510 calculates a saturation reference value using the saturation parameter. In detail, the reference value calculation unit 510 may calculate the saturation reference value using Equation 6 below:

$$\begin{bmatrix} \text{SATURATION REFERENCE VALUE}_{Cb} \\ \text{SATURATION REFERENCE VALUE}_{Cr} \end{bmatrix} = \begin{bmatrix} \frac{Cbscp}{Cbmax} * \text{SATURATION BOUNDARY VALUE} \\ \frac{Crscp}{Crmax} * \text{SATURATION BOUNDARY VALUE} \end{bmatrix}$$ [Equation 6]

where (Cbscp, Crscp) refers to a saturation control point, and (Cbmax, Crmax) refers to saturation boundary coordinates.

As described above, the saturation reference value is calculated with respect to the saturation components Cb and Cr. The saturation boundary value refers to the maximum saturation value of the maximum value of the saturation components Cb and Cr. In this case, the reference value calculation unit 510 may calculate the saturation boundary value using Equation 7 below:

$$\text{SATURATION BOUNDARY VALUE} = \frac{1}{\cos H} * \sqrt{Cbmax^2 + Crmax^2} \quad \text{[Equation 7]}$$

where H is a hue angle of the YCbCr color signal.

Figure 4A:
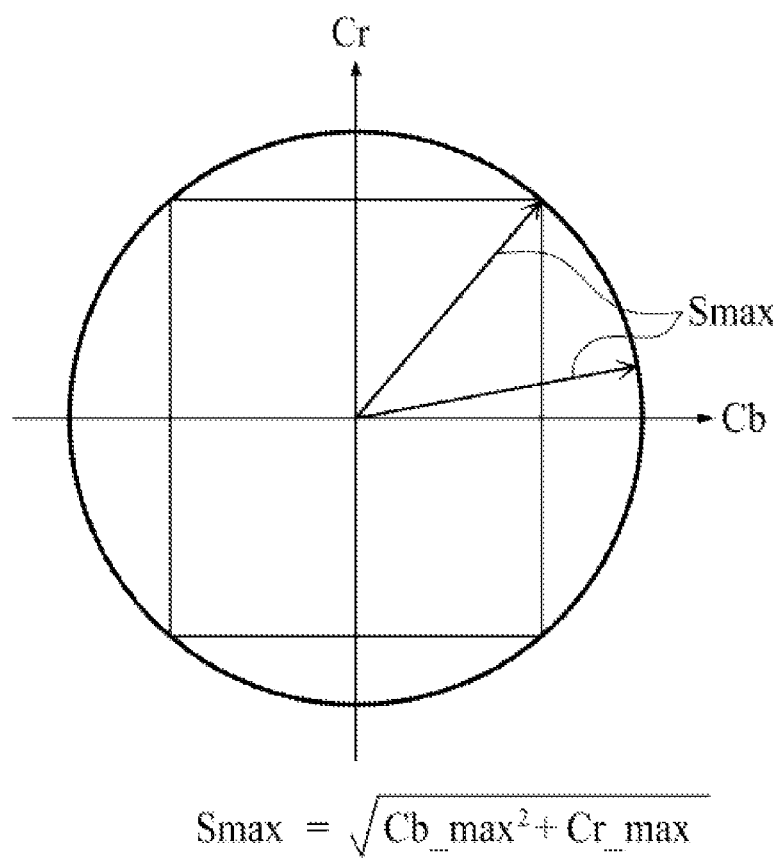
FIG. 4A is a diagram showing that a saturation boundary value is calculated in the related art.

As shown in FIG. 4A of the related art, the saturation boundary value Smax is calculated as a value corresponding to the boundary of a circle on the Cb-Cr coordinate plane. However, since the saturation boundary value is not the boundary of the circle but the boundary of a rectangle included therein, a value outside the boundary of the rectangle is calculated as the saturation boundary value, and thus an error occurs during color gamut mapping.

In order to solve this problem, as shown in FIG. 4B, the reference value calculation unit 510 compensates for a cosine value for the hue angle H as Equation 7 above to calculate a saturation boundary value Smax1 or Smax2 on the Cb-Cr coordinate plane. Thus, according to the present disclosure, the error is minimized during color gamut mapping by calculating the saturation boundary value as the boundary of the rectangle on the Cb-Cr coordinate plane.

In an embodiment, there may be a plurality of saturation reference values. For example, the saturation reference value may include a first reference value and a second reference value. In this case, the second reference value may be greater than the first reference value. When following this example, the saturation control point (Cbscp, Crscp) may include a first saturation control point (Cbscp1, Crscp1) and a second saturation control point (Cbscp2, Crscp2).

The determination unit 520 compares the saturation value of the saturation components Cb and Cr to the saturation reference value to determine an area including the saturation value of the saturation components Cb and Cr. For example, when the saturation reference value includes a first reference value and a second reference value, the determination unit 520 compares the first and second reference values to the saturation value of the saturation components Cb and Cr. When the saturation value of the saturation components Cb and Cr is smaller than the first reference value, the determination unit 520 determines that the saturation value of the corresponding saturation components Cb and Cr is included in a low area. When the saturation value of the saturation components Cb and Cr is greater than the first reference value and smaller than the second reference value, the determination unit 520 determines that the saturation value of the corresponding saturation components Cb and Cr is included in a middle area. When the saturation value of the saturation components Cb and Cr is greater than the second reference value, the determination unit 520 determines that the saturation value of the corresponding saturation components Cb and Cr is included in a high area.

The conversion unit 530 converts the saturation components Cb and Cr so that the saturation components Cb and Cr are mapped to a predetermined color gamut according to the saturation value of the saturation components Cb and Cr.

In an embodiment, when the saturation value of the corresponding saturation components Cb and Cr is determined as being included in the low area, the conversion unit 530 changes the saturation components Cb and Cr using Equation 8 below:

$$\begin{bmatrix} Cb' \\ Cr' \end{bmatrix} = \begin{bmatrix} a*Cb \\ a*Cr \end{bmatrix}. \quad \text{[Equation 8]}$$

Also, when the saturation value of the corresponding saturation components Cb and Cr is determined as being included in the middle area, the conversion unit 530 changes the saturation components Cb and Cr using Equation 9 below:

$$\begin{bmatrix} Cb' \\ Cr' \end{bmatrix} = \begin{bmatrix} b*(Cb - Cbscp1) + a*Cbscp1 \\ b*(Cr - Crscp1) + a*Crscp1 \end{bmatrix}. \quad \text{[Equation 9]}$$

Also, when the saturation value of the corresponding saturation components Cb and Cr is determined as being included in the high area, the conversion unit 530 changes the saturation components Cb and Cr using Equation 10 below:

$$\begin{bmatrix} Cb' \\ Cr' \end{bmatrix} = \begin{bmatrix} c*(Cb - Cbscp2) + b*Cbscp2 - Cbscp1) + a*Cbscp1 \\ c*(Cr - Crscp2) + b*Crscp2 - Crscp1 + a*Crscp1 \end{bmatrix}. \quad \text{[Equation 10]}$$

In Equations 8 to 10, Cb' and Cr' are changed saturation components, a is a first saturation slope (gain), b is a second saturation slope (gain), c is a third saturation slope (gain), (Cbscp1, Crscp1) is a first saturation control point, and (Cbscp2, Crscp2) is a second saturation control point.

Figure 5A:
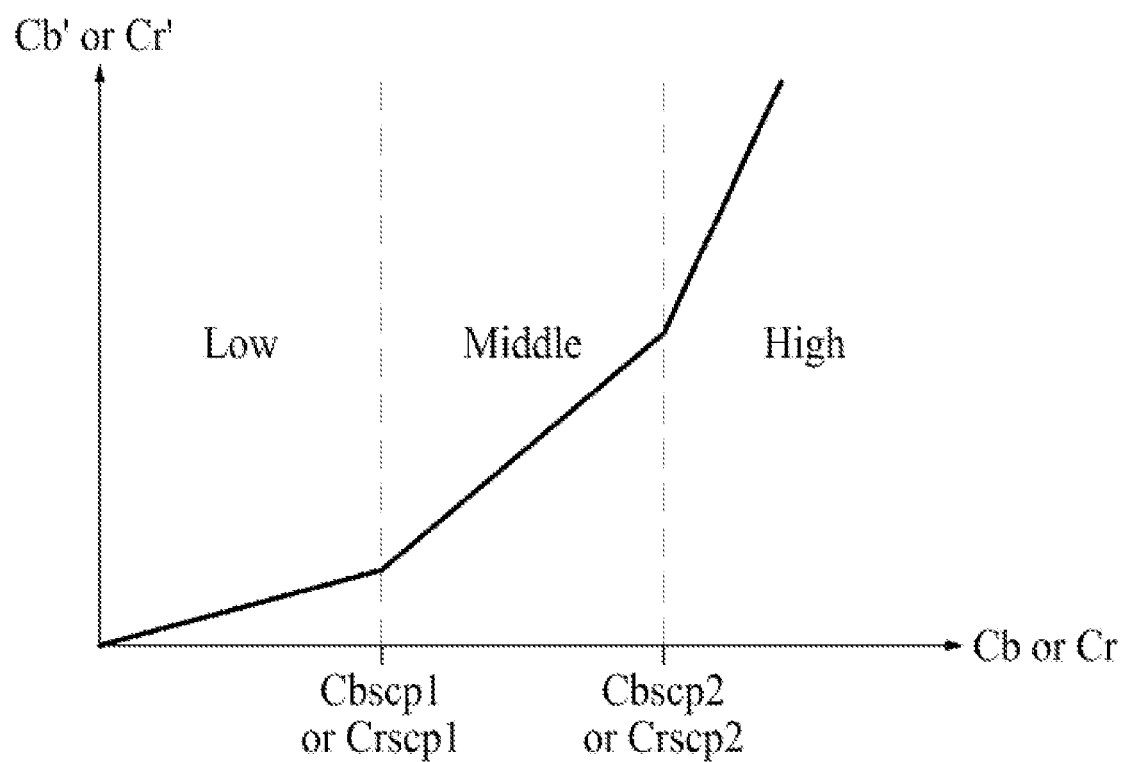
FIG. 5A is a diagram showing a graph schematically showing Equations 8 to 10 according to an embodiment of the present disclosure.
Figure 5B:
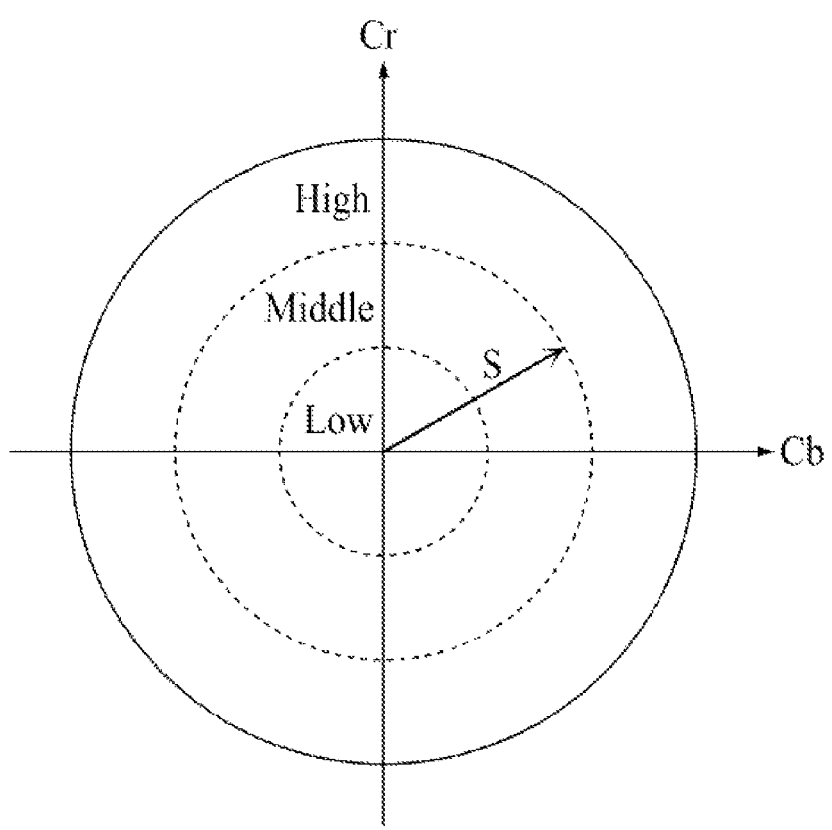
FIG. 5B is a diagram showing a low region, a middle region, and a high region on the Cb-Cr coordinate plane according to an embodiment of the present disclosure.

When schematically showing Equations 8 to 10, the conversion unit 530 according to the present disclosure may change the saturation components Cb and Cr according to the graph as shown in FIG. 5A. When the saturation value of the saturation components Cb and Cr is included in the low area, the conversion unit 530 changes the corresponding saturation components Cb and Cr along a line with the first saturation slope of the corresponding low area. When the saturation value of the saturation components Cb and Cr is included in the middle area, the conversion unit 530 changes the corresponding saturation components Cb and Cr along a line with the second saturation slope of the corresponding middle area. When the saturation value of the saturation components Cb and Cr is included in the high area, the conversion unit 530 changes the corresponding saturation components Cb and Cr along a line with the third saturation slope of the corresponding high area. In this case, areas including the saturation components Cb and Cr may be classified on the Cb-Cr coordinate plane as shown in FIG. 5B.

As described above, when the saturation value of the corresponding saturation components Cb and Cr is smaller than the first reference value, the saturation changing unit 410 according to the present disclosure changes the corresponding saturation components Cb and Cr using Equation 8 above. Also, when the saturation value of the corresponding saturation components Cb and Cr is greater than the first reference value and smaller than the second reference value, the saturation changing unit 410 changes the corresponding saturation components Cb and Cr using Equation 9 above. Also, when the saturation value of the corresponding saturation components Cb and Cr is greater than the second reference value, the saturation changing unit 410 changes the corresponding saturation components Cb and Cr using Equation 10 above.

Meanwhile, the conversion unit 530 forwards the YCbCr-type color signal (Y, Cb, Cr), of which the saturation components Cb and Cr are changed, to the hue changing unit 420.

The hue changing unit 420 changes the hue of the YCbCr color signal (Y, Cb, Cr) by rotating the saturation components Cb and Cr of the YCbCr-type color signal (Y, Cb, Cr). In detail, the hue changing unit 420 may rotate the saturation components of the corresponding color signal using Equation 11 below:

$$\begin{bmatrix} Cb' \\ Cr' \end{bmatrix} = \begin{bmatrix} Cb*\cos X + Cr*\sin X \\ -Cb*\sin X + Cr*\cos X \end{bmatrix} \quad \text{[Equation 11]}$$

where Cb and Cr are saturation components of the YCbCr color signal (Y, Cb, Cr), Cb' and Cr' are rotated saturation components, and X is a hue parameter generated by the parameter generation unit 240.

Figure 6:
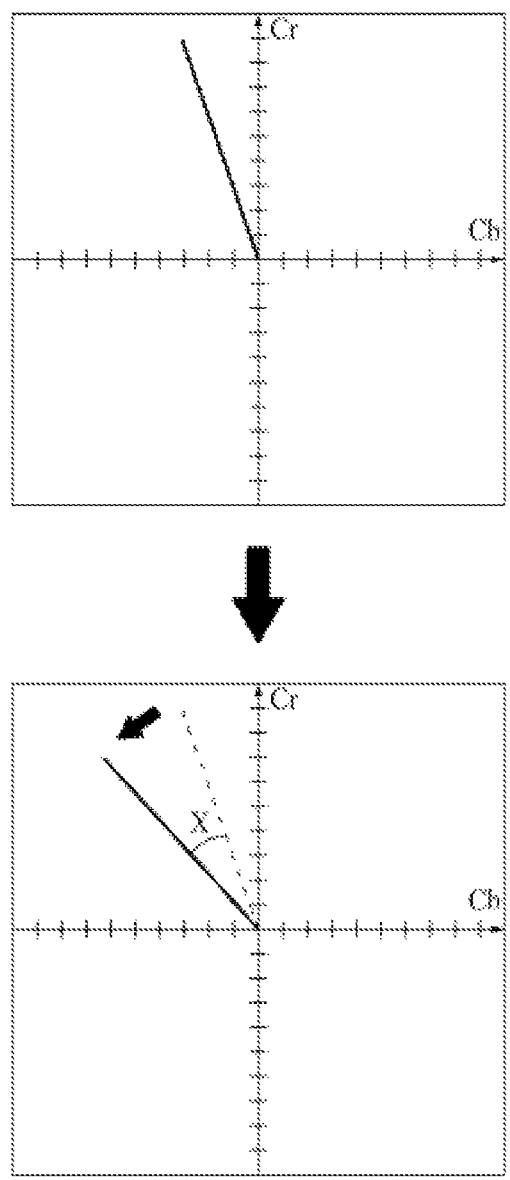
FIG. 6 is a diagram showing an example in which a hue changing unit according to an embodiment of the present disclosure rotates a saturation component to change a hue.

The hue changing unit 420 according to the present disclosure changes a hue by rotating the saturation components Cb and Cr along Equation 11 above, as shown in FIG. 6. The hue changing unit 420 forwards the YCbCr-type color signal (Y, Cb, Cr), of which the hue is changed, to the luminance changing unit 430.

The luminance changing unit 430 changes a luminance component Y of the YCbCr-type color signal (Y, Cb, Cr) using the luminance parameter generated by the parameter generation unit 240. Specifically, the luminance changing unit 430 multiplies the luminance component Y of the YCbCr-type color signal (Y, Cb, Cr) by the luminance parameter to change the corresponding luminance component.

The luminance changing unit 430 forwards the YCbCr-type color signal (Y, Cb, Cr), of which the luminance is changed, to the white point compensation unit 260.

In the above-described embodiment, it has been described that the changes are made in the order of saturation, hue, and luminance, but this is just one embodiment. The changes may be made in an order different from the above order or at the same time.

Figure 7:
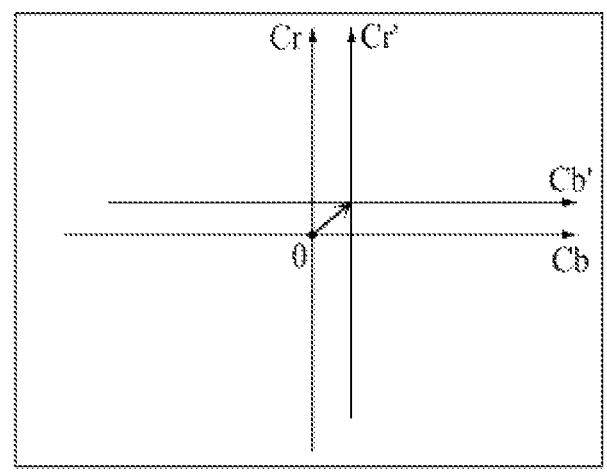
FIG. 7 is a diagram showing an example in which a white point compensation unit according to an embodiment of the present disclosure compensates a white offset for a saturation component.
Figure 7:
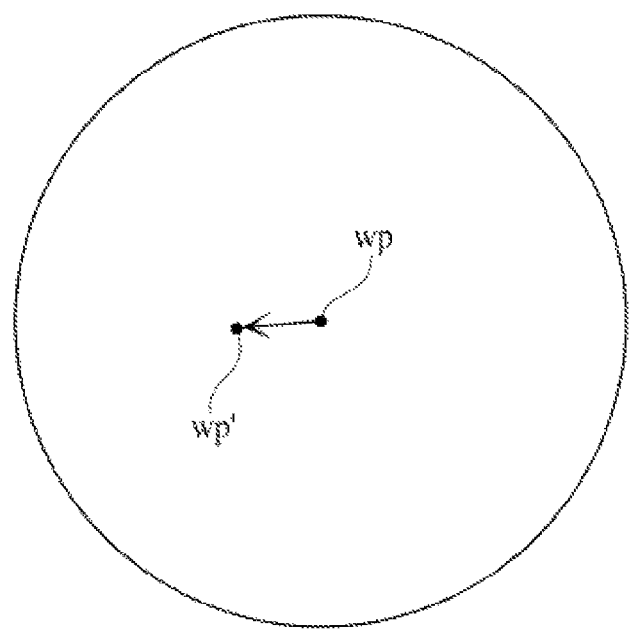

The white point compensation unit 260 may compensate a white offset for the saturation components Cb and Cr of the YCbCr-type color signal (Y, Cb, Cr) to correspondingly match a white point wp' to the corresponding saturation components Cb and Cr. For example, as shown in FIG. 7, by compensating the white offset to the saturation components Cb and Cr, the white point compensation unit 260 may move the white point wp, which is originally placed at an origin on the Cb-Cr coordinate plane, to correspondingly match the white point wp' to the corresponding saturation components Cb and Cr.

Since the white point of the related art is fixed at the origin on the Cb-Cr coordinate plane, a white offset occurs when the YCbCr-type color signal (Y, Cb, Cr) is changed. However, according to the present disclosure, by removing the white offset through the white point compensation unit 260, an error generated during color gamut mapping is minimized.

In the above-described embodiment, it has been described that the white point compensation unit 260 adjusts the white point of the YCbCr-type color signal (Y, Cb, Cr) that has passed through the color signal changing unit 250. However, this is just an embodiment, and thus the white point of the YCbCr-type color signal (Y, Cb, Cr) may be adjusted before the YCbCr-type color signal (Y, Cb, Cr) passes through the color signal changing unit 250.

Meanwhile, the white point compensation unit 260 forwards the YCbCr-type color signal (Y, Cb, Cr), of which the white point is adjusted, to the color space conversion unit 220. Accordingly, the YCbCr-type color signal (Y, Cb, Cr) is inversely converted into an RGB-type color signal (R, G, B) by the color space conversion unit 220.

By changing the saturation, hue, and luminance of a color signal, the color gamut mapping device 100 according to the present disclosure maps the corresponding color signal to a predetermined color gamut.

Figure 8A:
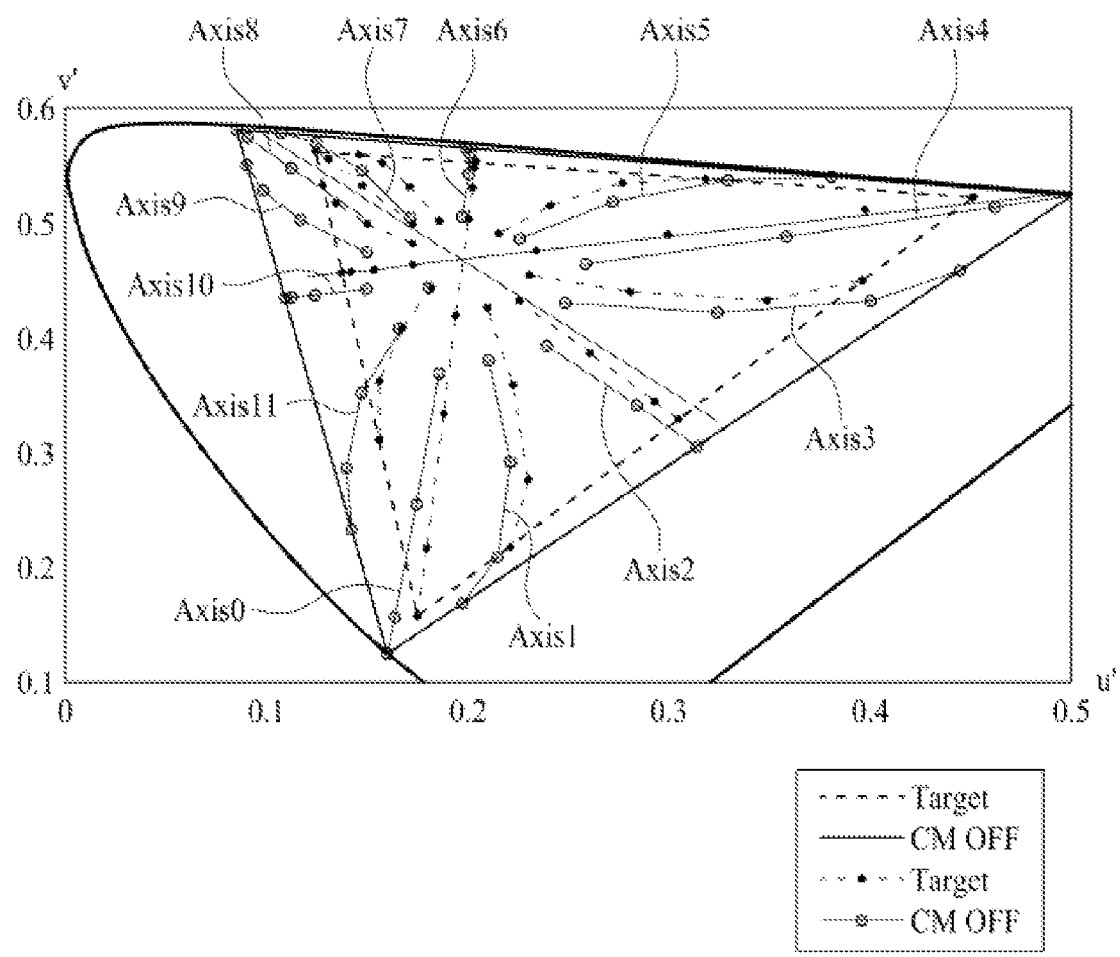
FIG. 8A is a diagram showing a color gamut of a color signal before being mapped to a predetermined color gamut.
Figure 8B:
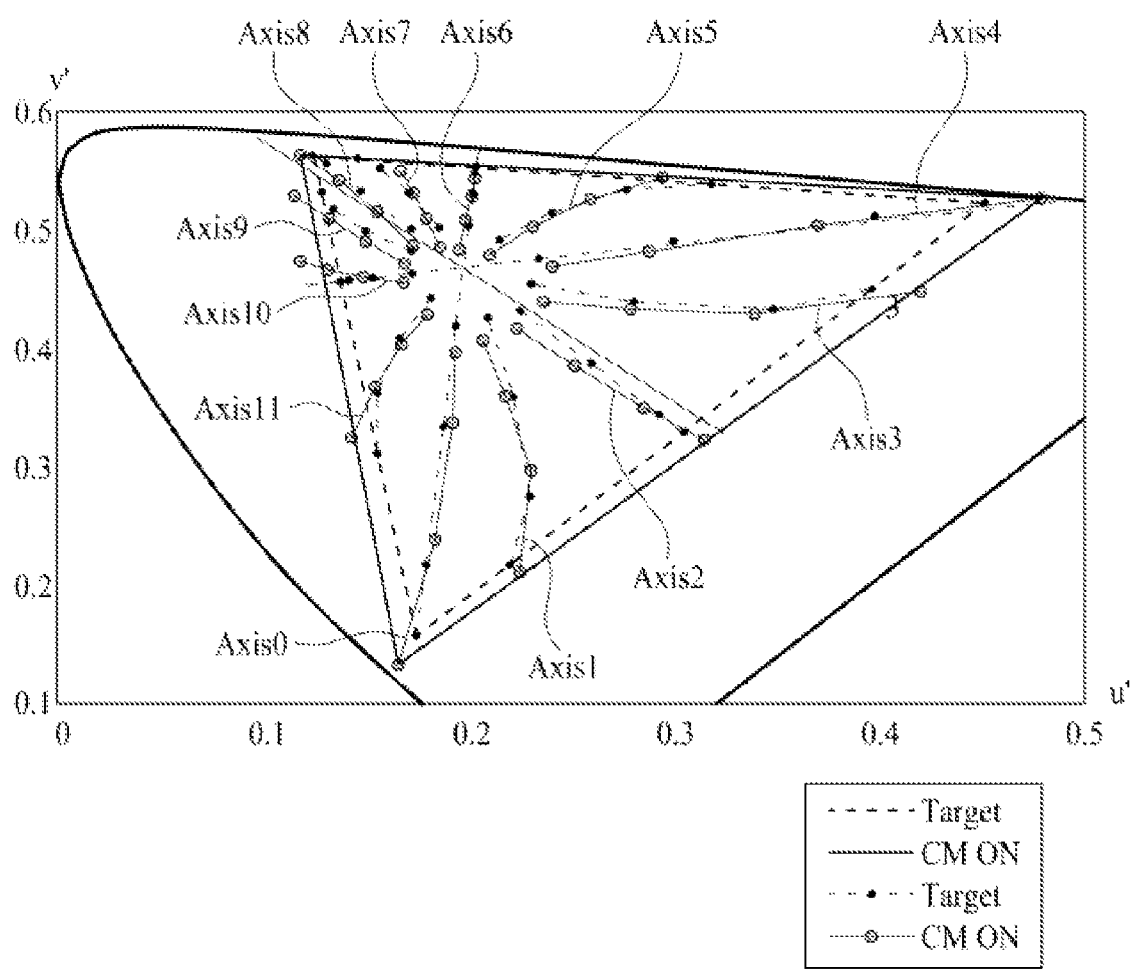
FIG. 8B is a diagram showing a color gamut of a color signal after being mapped to a predetermined color gamut by a color gamut mapping device according to an embodiment of the present disclosure.

FIG. 8A is a diagram showing a color gamut (CM OFF) of a color signal before being mapped to a predetermined color gamut, and FIG. 8B is a diagram showing a color gamut (CM ON) of a color signal after being mapped to a predetermined color gamut by a color gamut mapping device according to an embodiment of the present disclosure.

Referring to FIGS. 8A and 8B, by minimizing an error of color gamut mapping through fine adjustment of the saturation, hue, and luminance of a color signal, the color gamut mapping device 100 according to the present disclosure may accurately map the corresponding color signal to a target color gamut.

The color gamut mapping device 100 according to the above embodiment may be applied to a display system.

A color gamut mapping device 100 to be applied to a display device will be described in detail below with reference to FIG. 9.

Figure 9:
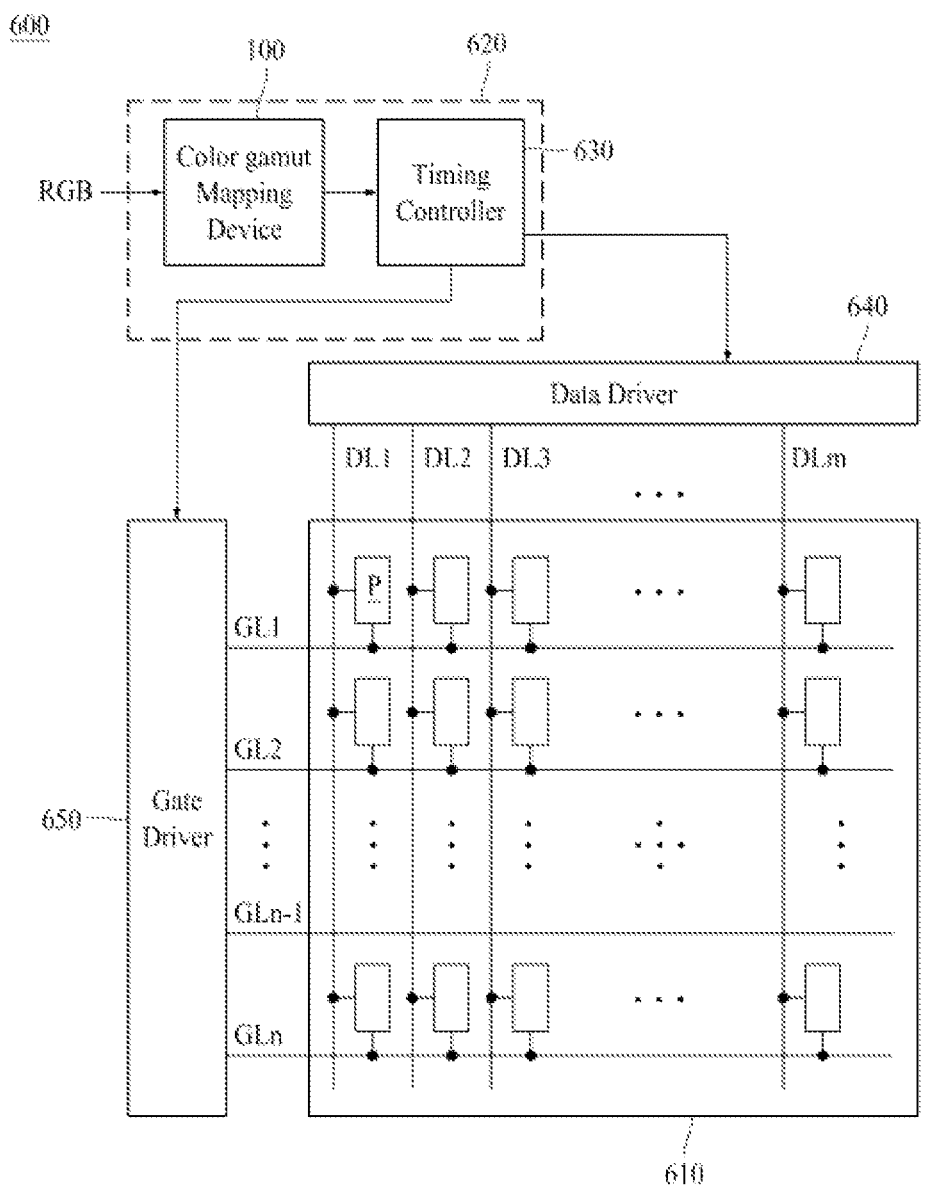
FIG. 9 is a diagram showing a display system including a color gamut mapping device according to an embodiment of the present disclosure.

FIG. 9 is a diagram showing a display system including a color gamut mapping device according to an embodiment of the present disclosure.

A display system 600 includes a display panel 610, a video processing device 620, a data driver 640, and a gate driver 650.

The display panel 610 includes a plurality of gate lines GL1 to GLn and a plurality of data lines DL1 to DLm which are alternately arranged to define a plurality of pixel areas and pixels P provided in the plurality of pixel areas. The plurality of gate lines GL1 to GLn may be horizontally arranged, and the plurality of data lines DL1 to DLm may be vertically arranged, but the embodiment is not limited thereto.

In an embodiment, the display panel 610 may be a liquid crystal display (LCD) panel. In another embodiment, the display panel 610 may be an organic light-emitting diode (OLED) panel.

The video processing device 620 includes a color gamut mapping device 100 and a timing controller 630.

The color gamut mapping device 100 may map RGB source image data received from an external system (not shown) to a predetermined color gamut. It has been described that the color gamut mapping device 100 maps the RGB source image data to a predetermined color gamut, and thus a detailed description will be omitted.

When the RGB-type source image data is mapped to the predetermined color gamut, the color gamut mapping device 100 forwards the RGB-type source image data to the timing controller 630.

The timing controller 630 receives various timing signals including a vertical synchronization signal Vsync, a horizontal synchronization signal, a data enable signal, a clock signal, and the like from an external system (not shown) and generates data control signals for controlling the data driver 640 and gate control signals for controlling the gate driver 650.

In an embodiment, the data control signals may include a source start pulse, a source sampling clock, and a source-output-enable signal, and the like, and the gate control signals may include a gate start pulse, a gate shift clock, a gate-output-enable signal, and the like.

Here, the source start pulse controls data sampling start timing of one or more data driving circuits constituting the data driver 640. The source sampling clock is a clock signal for each data driving circuit to control sampling timing of data. The source-output-enable signal controls output timing of the data driver 640.

The gate start pulse controls the operation start timing of one or more gate driving circuits constituting the gate driver 650. The gate shift clock is a clock signal input to one or more gate driving circuits in common and controls shift timing of a scan signal (a gate pulse). The gate-output-enable signal specifies timing information of one or more gate driving circuits.

Meanwhile, the timing controller 630 according to the present disclosure converts the RGB-type source image data mapped to a target color gamut by the color gamut mapping device 100 into a data signal format which can be processed by the data driver 640, and then outputs the RGB-type source image data as output image data.

According to the data control signals supplied by the timing controller 630, the data driver 640 converts aligned output image data output from the timing controller 630 into a video data signal, which is an analog signal, and then supplies video data signals of one horizontal line to the data lines DL1 to DLm every horizontal period in which a scan pulse is supplied to the gate lines GL1 to GLn.

As described above, the data driver 640 may be disposed on one side of the display panel 610, e.g., on an upper side. In some cases, however, the data driver 640 may be disposed on one side and the other side of the display panel 610, which are opposite to each other, for example, on both upper and lower sides. The data driver 640 may include a plurality of source driver integrated circuits (ICs) (not shown). The data driver 640 may be implemented in the form of a tape carrier package or a chip on film on which a source driver IC is mounted, but the embodiment is not limited thereto.

In an embodiment, the source driver IC may include a shift register, a latch, a digital-analog converter (DAC), and an output buffer. Also, the source driver IC may further include a level shifter configured to shift a voltage level of digital data corresponding to the output image data output from the timing controller 630 to a desired voltage level.

The gate driver 650 includes a shift register configured to sequentially generate a scan pulse, i.e., a gate high-pulse in response to the gate start pulse and the gate shift clock among the gate control signals received from the timing controller 630. A thin-film transistor TFT is turned on in response to the scan pulse.

As described above, the gate driver 650 may be disposed on one side of the display panel 610, e.g., on the left side. In some cases, however, the gate driver 650 may be disposed on one side and the other side of the display panel 610, which are opposite to each other, for example, on both of the left and right sides. The gate driver 650 may include a plurality of gate driver ICs (not shown). The gate driver 650 may be implemented in the form of a tape carrier package or a chip on film on which a gate driver IC is mounted, but the embodiment is not limited thereto. A gate driver IC may be built in the display panel 610.

It will be understood by those skilled in the art that the present disclosure can be implemented in other specific forms without changing the technical spirit or essential features of the present disclosure.

For example, the display driving device according to the present disclosure may be implemented in the form of an IC, and the function of the display driving device may be implemented in the form of a program and installed in the IC. When the function of the display driving device according to the present disclosure is implemented as a program, the functions of elements included in the display driving device are implemented as a specific code. Codes for implementing the specific function may be implemented as a single program or may be implemented as a plurality of programs in a distributed manner.

According to the present disclosure, it is possible to minimize hue distortion by allowing the saturation, hue, and luminance of a color signal to be changed to map the corresponding color signal to a predetermined color gamut.

According to the present disclosure, it is possible to finely adjust the saturation of a color signal by allowing the saturation of the color signal to be changed according to a plurality of saturation reference values.

According to the present disclosure, it is possible to easily change and finely adjust a corresponding color signal by allowing a hue axis to be matched to a primary color and a secondary color.

Therefore, it should be understood that the above embodiments are illustrative rather than restrictive in all respects. The scope of the present disclosure is shown by the following claims rather than the foregoing detailed description, and all changes or modifications derived from the meaning and scope of the claims and their equivalents should be construed as being included in the scope of the present disclosure.

What is claimed is:

1. A color gamut mapping device capable of fine adjustment, the color gamut mapping device comprising:
   a hue angle calculation unit configured to calculate a hue angle using saturation components (Cb, Cr) of a YCbCr-type color signal (Y, Cb, Cr);
   a parameter generation unit configured to generate at least one of a saturation parameter, a luminance parameter, and a hue parameter using the hue angle; and
   a color signal changing unit configured to change the YCbCr-type color signal (Y, Cb, Cr) to be mapped to a predetermined color gamut using the at least one parameter,
   wherein the color signal changing unit comprises a saturation changing unit configured to calculate a saturation boundary value determined as a boundary of a predetermined rectangle on a Cb-Cr coordinate plane using the saturation parameter and configured to change the saturation components (Cb, Cr) on the basis of the saturation boundary value.

2. The color gamut mapping device of claim 1, wherein the saturation parameter comprises at least one of a predetermined saturation control point (Cbscp, Crscp), saturation boundary coordinates (Cbmax, Crmax) at which the saturation components (Cb, Cr) are maximized, and a saturation slope corresponding to the saturation control point (Cbscp, Crscp).

3. The color gamut mapping device of claim 1, wherein the saturation changing unit comprises a reference value calculation unit configured to calculate the saturation boundary value according to an Equation below:

$$\text{SATURATION BOUNDARY VALUE} = \frac{1}{\cos H} * \sqrt{Cbmax^2 + Crmax^2}$$

where H is the hue angle.

4. The color gamut mapping device of claim 1, wherein the saturation changing unit changes the saturation components (Cb, Cr) according to a result of comparing a saturation reference value calculated using the saturation boundary value to a saturation value of the saturation components (Cb, Cr).

5. The color gamut mapping device of claim 4, wherein
the saturation reference value comprises: a first reference value and a second reference value greater than the first reference value, and
when the saturation value is smaller than the first reference value, the saturation changing unit changes the saturation components (Cb, Cr) according to an Equation below:

$$\begin{bmatrix} Cb' \\ Cr' \end{bmatrix} = \begin{bmatrix} a*Cb \\ a*Cr \end{bmatrix},$$

when the saturation value is greater than the first reference value and smaller than the second reference value, the saturation changing unit changes the saturation components (Cb, Cr) according to an Equation below:

$$\begin{bmatrix} Cb' \\ Cr' \end{bmatrix} = \begin{bmatrix} b*(Cb - Cbscp1) + a*Cbscp1 \\ b*(Cr - Crscp1) + a*Crscp1 \end{bmatrix},$$

when the saturation value is greater than the second reference value, the saturation changing unit changes the saturation components (Cb, Cr) according to an Equation below:

$$\begin{bmatrix} Cb' \\ Cr' \end{bmatrix} = \begin{bmatrix} c*(Cb - Cbscp2) + b*(Cbscp2 - Cbscp1) + a*Cbscp1 \\ c*(Cr - Crscp2) + b*(Crscp2 - Crscp1) + a*Crscp1 \end{bmatrix}$$

where Cb' and Cr' are changed saturation components, a is a first saturation slope, b is a second saturation slope, c is a third saturation slope, (Cbscp1, Crscp1) is a first saturation control point, and (Cbscp2, Crscp2) is a second saturation control point.

6. The color gamut mapping device of claim 1, wherein the saturation changing unit comprises a reference value calculation unit configured to calculate a saturation reference value according to an Equation below:

$$\begin{bmatrix} \text{SATURATION REFERENCE VALUE}_{Cb} \\ \text{SATURATION REFERENCE VALUE}_{Cr} \end{bmatrix} = \begin{bmatrix} \frac{Cbscp}{Cbmax} * \text{SATURATION BOUNDARY VALUE} \\ \frac{Crscp}{Crmax} * \text{SATURATION BOUNDARY VALUE} \end{bmatrix}$$

where (Cbscp, Crscp) is a saturation control point and (Cbmax, Crmax) are saturation boundary coordinates.

7. The color gamut mapping device of claim 1, wherein the color signal changing unit comprises a hue changing unit configured to change a hue of the YCbCr-type color signal (Y, Cb, Cr) by rotating the saturation components (Cb, Cr) by the hue parameter with respect to an origin on a Cb-Cr coordinate plane.

8. The color gamut mapping device of claim 7, wherein the hue changing unit changes the hue according to an Equation below:

$$\begin{bmatrix} Cb' \\ Cr' \end{bmatrix} = \begin{bmatrix} Cb*\cos X + Cr*\sin X \\ -Cb*\sin X + Cr*\cos X \end{bmatrix}$$

where Cb' and Cr' are rotated saturation components, and X is the hue parameter.

9. The color gamut mapping device of claim 1, wherein the color signal changing unit comprises a luminance changing unit configured to change a luminance component (Y) by multiplying the luminance component of the YCbCr-type color signal (Y, Cb, Cr) by the luminance parameter.

10. The color gamut mapping device of claim 1, wherein the parameter generation unit comprises:
a hue axis selection unit configured to select a first hue axis and a second hue axis including the hue angle from among a plurality of hue axes placed on a Cb-Cr coordinate plane where a saturation component is placed; and
a parameter calculation unit configured to calculate the parameter using a first reference parameter mapped to the first hue axis, a second reference parameter mapped to the second hue axis, and the hue angle.

11. The color gamut mapping device of claim 10, wherein the hue axis selection unit rotates the plurality of hue axes by a predetermined angle.

12. The color gamut mapping device of claim 1, wherein the parameter generation unit calculates the parameter according to an Equation below:

$$\text{Parameter} = \frac{(H\_\text{Axis}(n+1) - H)}{H\_\text{Axis}(n+1) - H\_\text{Axis}(n)} * P\_\text{Axis}(n+1) + \frac{(H - H\_\text{Axis}(n))}{H\_\text{Axis}(n+1) - H\_\text{Axis}(n)} * P\_\text{Axis}(n)$$

where H is a hue angle, H_Axis(n+1) is an angle of a second hue axis, H_Axis(n) is an angle of a first hue axis, P_Axis (n+1) is a second reference parameter mapped to the second hue axis, and P_Axis(n) is a first reference parameter mapped to the first hue axis.

13. The color gamut mapping device of claim 1, wherein the hue angle calculation unit calculates the hue angle according to an Equation below:

$$H = a\tan(Cb, Cr)$$

where H is the hue angle, and Cb and Cr are the saturation components.

14. The color gamut mapping device of claim 1, further comprising a color space conversion unit configured to convert an RGB-type color signal (R, G, B) into the YCbCr-type color signal (Y, Cb, Cr) and output the YCbCr-type color signal (Y, Cb, Cr) to the hue angle calculation unit and inversely convert the YCbCr-type color signal (Y, Cb, Cr) output from the color signal changing unit into the RGB-type color signal (R, G, B) and output the RGB-type color signal (R, G, B).

15. The color gamut mapping device of claim 1, further comprising a gray detector configured to, when an RGB-type color signal (R, G, B) is input, compare the RGB-type color signal (R, G, B) to a predetermined gray parameter to determine whether to perform color gamut mapping.

16. The color gamut mapping device of claim 15, wherein the gray detector determines whether to perform the color gamut mapping according to an Equation below:

$$(\max(R-G, R-B, G-B) < \text{gray\_parameter})$$

17. The color gamut mapping device of claim 15, wherein the gray detector excludes the color gamut mapping when the RGB-type color signal (R, G, B) is smaller than the gray parameter.

18. The color gamut mapping device of claim 1, further comprising a white point compensation unit configured to compensate a white offset for the saturation components (Cb, Cr) output from the color signal changing unit to perform matching on a white point.

\* \* \* \* \*